United States Patent [19]

Hashimoto et al.

[11] Patent Number: 4,458,840
[45] Date of Patent: Jul. 10, 1984

[54] TEMPERATURE RESPONSIVE VALVE

[75] Inventors: Nobuyuki Hashimoto; Atsushi Satomoto, both of Toyota, Japan

[73] Assignee: Aisin Seiki Kabushiki Kaisha, Kariya, Japan

[21] Appl. No.: 537,326

[22] Filed: Sep. 30, 1983

Related U.S. Application Data

[63] Continuation of Ser. No. 314,451, Oct. 23, 1981, abandoned.

[30] Foreign Application Priority Data

Oct. 24, 1980 [JP] Japan .................................. 55-151158

[51] Int. Cl.³ ............................................. G05D 23/10
[52] U.S. Cl. ................................ 236/48 R; 236/101 C
[58] Field of Search ..................... 236/48 R, 87, 101 C

[56] References Cited

U.S. PATENT DOCUMENTS 4,076,172 2/1978 Inada et al. .................. 236/48 R
4,157,158 6/1979 Kitamura et al. ............. 236/48 R
4,247,041 1/1981 Kitamura et al. ............. 236/48 R Primary Examiner—William E. Tapolcai
Attorney, Agent, or Firm—Oblon, Fisher, Spivak, McClelland & Maier

[57] ABSTRACT

A temperature responsive valve includes a bimetal disk which snaps in response to changes in temperature, a rod moved by the snapping action of the bimetal disk, a valve member in association with movement of the rod to thereby control the flow of fluid, and an adjustment member threaded through a body to properly adjust the range in movement of the valve member, the adjustment member being secured to the body after adjusting operation of the range of movement of the valve member.

5 Claims, 2 Drawing Figures

TEMPERATURE RESPONSIVE VALVE

This application is a continuation of application Ser. No. 314,451, filed Oct. 23, 1981, now abandoned.

BACKGROUND OF THE INVENTION

1. Field of the Invention

This invention relates to a temperature responsive valve, and more particularly to a temperature responsive valve which controls flow of fluid in association with the snapping action of a bimetal disk in response to changes in temperature.

2. Description of the Prior Art

Conventionally, a temperature responsive valve has been proposed for use in an emission control system of vehicles which includes a bimetal disk which snaps in response to changes in temperature, a rod moved by the snapping action of the bimetal disk, and a valve member in association with movement of the rod to thereby control the flow of fluid. Such temperature responsive valve further includes an adjustment member which is, for example adjustably threaded through a body to thereby adjust the range of movement of the valve member. Thus, quantity of flow of fluid may be properly adjusted. In such prior temperature responsive valve, however, the relative position between the body and the adjustment member is changed due to loosening of the threaded portions therebetween caused by vibration of the vehicle and the like. In order to overcome this disadvantage, the use of a locking plate has been proposed to prevent relative rotation between the body and the adjustment member. Thus in the prior temperature responsive valve, the number of parts is necessarily increased and thus results in high cost of manufacturing.

SUMMARY OF THE INVENTION

It is therefore an object of the present invention to provide an improved temperature responsive valve which obviates the disadvantages of the prior art as mentioned above.

It is another object of the present invention to provide an improved temperature responsive valve which is low in cost and is simple in construction.

According to the present invention, a temperature responsive valve includes a bimetal disk which snaps in response to changes in temperature, a rod moved by the snapping action of the bimetal disk, a valve member in association with movement of the rod to thereby control the flow of fluid, and an adjustment member threaded through a body to properly adjust the range in movement of the valve member, the adjustment member being secured to the body after adjusting operation of the range of movement of the valve member.

BRIEF DESCRIPTION OF THE DRAWINGS

Various other objects, features and attendant advantages of the present invention will be fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
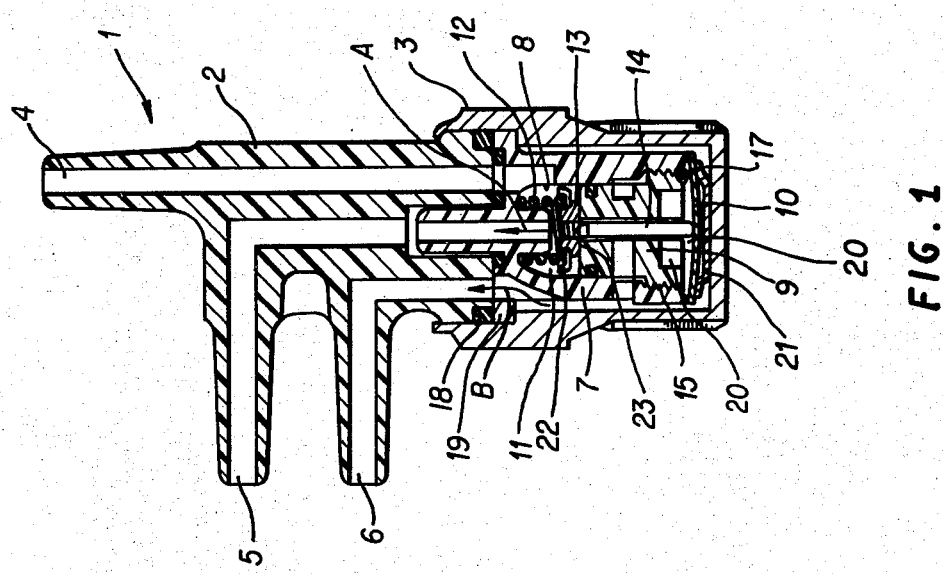
FIG. 1 is a cross-sectional view showing a first embodiment of the present invention.

In FIG. 1, a temperature responsive valve 1 includes a housing 2 of resin material having three ports 4, 5 and 6 and a casing 3 of metal material which is secured to housing 2 through an O-ring seal 18. Casing 3 may be threaded through the water packet of the engine of the vehicle. A body 7 of resin material which is positioned within casing 3 has a large diameter portion 19 which is secured between housing 2 and casing 3.

An adjustment member 9 formed of resin material which is the same as body 7 is positioned within body 7 so that two chambers 11 and 20 are thereby defined. Positioned within chamber 20 is a bimetal disk 10 which snaps or changes shape from being concave to being convex or vice-versa in response to changes in temperature between a first position wherein bimetal 10 is curved downwardly and the outer periphery thereof is brought into contact with the lower end of body 7, as shown in FIG. 1 and a second position wherein bimetal 10 is curved upwardly and the outer periphery thereof is spaced from the lower end of body 7.

Bimetal 10 is continuously upwardly biased by means of a spring 21. A valve member 13 is positioned within chamber 11 and is biased by means of a spring 12 in a first position where valve member 13 is spaced from a valve seat 22 provided on body 7 and is brought into contact with a valve seat 23 provided on adjustment member 9. Thus, inlet port 4 now communicates with outlet port 5 through passage A and is interrupted in communication with outlet port 6.

Valve member 13 is actuated by means of a rod 14 which passes through an axial aperture formed in adjustment member 9 with a small gap formed therebetween. Namely, the lower end of rod 14 is in contact with bimetal 10, and an upper end of rod 14 may be spaced from valve member 13 when bimetal 10 is in its illustrated initial position. When bimetal 10 snaps from the initial position into a second position, valve member 13 is moved via rod 14 from its initial position into the second position against spring 12. Thus valve member 13 now contacts with seat 22 and is spaced from seat 23. Therefore, passage A is now interrupted and inlet port 4 is in communication with outlet port 6 via passage B.

During the above-noted operation, flow of fluid is isolated from chamber 20 in which bimetal 10 is positioned by means of body 7 and adjustment member 9 so that bimetal 10 may not be influenced by the temperature of the fluid. Thus, bimetal 10 correctly snaps in response to changes in temperature, for example, the temperature of engine cooling water, which is to be sensed.

The above-noted adjuster 9 is threaded with bore 8 of body 7. If adjustment member 9 is upwardly screwed, the space between seats 22 and 23 will be reduced. When adjustment member 9 is loosened, the space between seats 22 and 23 will be increased. Thus, in response to upwardly screwing and loosening of adjustment member 9, the above-noted space will vary and, accordingly the range of movement of valve member 13 will be adjustably varied. This means that the quantity of fluid flow which is controlled by valve member 13 will be properly adjusted. After the above-noted adjustment, the lower portions 17 of threaded portions 15 between body 7 and adjustment member 9 are secured to each other. For example, the above-noted lower portions 17 may be welded to each other via a hot or burning gas flow which is injected via a nozzle (not shown). Thus, body 7 and adjustment member 9 are secured after the above-noted adjustment is accomplished and adjustment member 9 may be prevented from rotating due to vibrations and like circumstances.

Figure 2:
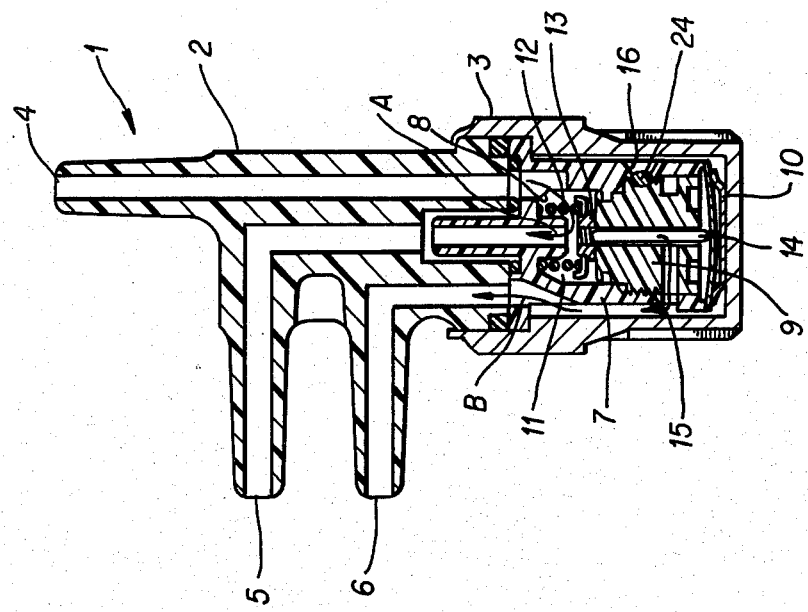
FIG. 2 is a view similar to that of FIG. 1, but showing a second embodiment of the present invention.

In FIG. 2, showing a second embodiment of the present invention, body 7 has a suitable hole 16 which corresponds to or opens into threaded portions 15 between body 7 and adjustment member 9. Thus, hot or burning gas is injected via hole 16 to threaded portions 15, and suitable portions 24 of threaded portions 15 may be welded after adjustment which is the same procedure as indicated in the previous embodiment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A temperature responsive valve comprising:
   a housing having inlet and outlet ports formed therein:
   a casing member secured to said housing;
   a body disposed within said housing and said casing member;
   an adjustment member threaded to said body via a threaded portion to thereby define a first and second chamber at opposite sides of said adjustment member;
   said adjustment member having a fluid passage provided therein for fluid communication with one of said outlet ports and wherein said fluid passage and said second chamber are fluidically isolated by said adjustment member;
   a valve member operatively associated with said adjustment member and positioned within said first chamber to control fluid communication between said inlet and outlet ports and wherein the range of movement of said valve member is adjusted by said adjustment member;
   bimetal disk means positioned within said second chamber for snapping in response to changes in temperature to thereby actuate said valve member; and
   means for rigidly securing said adjustment member to said body subsequent to adjustment of the range of movement of said valve member and wherein said means for rigidly securing said adjustment member to said body further comprises a heat welded connection at said threaded portion.

2. A temperature responsive valve according to claim 1, wherein said adjustment member includes an axial aperture formed therein and further comprising:
   a rod member mounted in said axial aperture wherein a lower end portion of said rod contacts said bimetal disk means and an upper end portion of said rod is spaced from said valve member in an initial operational position.

3. A temperature responsive valve according to claim 1 or 2, further comprising:
   a valve seat formed on said body; and
   spring means disposed between said valve member and said valve seat for biasing said valve seat away from said valve member.

4. The temperature responsive valve as claimed in claim 1 wherein said heat welded connection at said threaded portion further comprises said heat welded connection at a lower portion of said threaded connection.

5. The temperature responsive valve as claimed in claim 1 wherein said body further includes a hole provided therein such that said heat welded connection at said threaded portion is made through said hole.

* * * * *